United States Patent Office 2,781,570
Patented Feb. 19, 1957

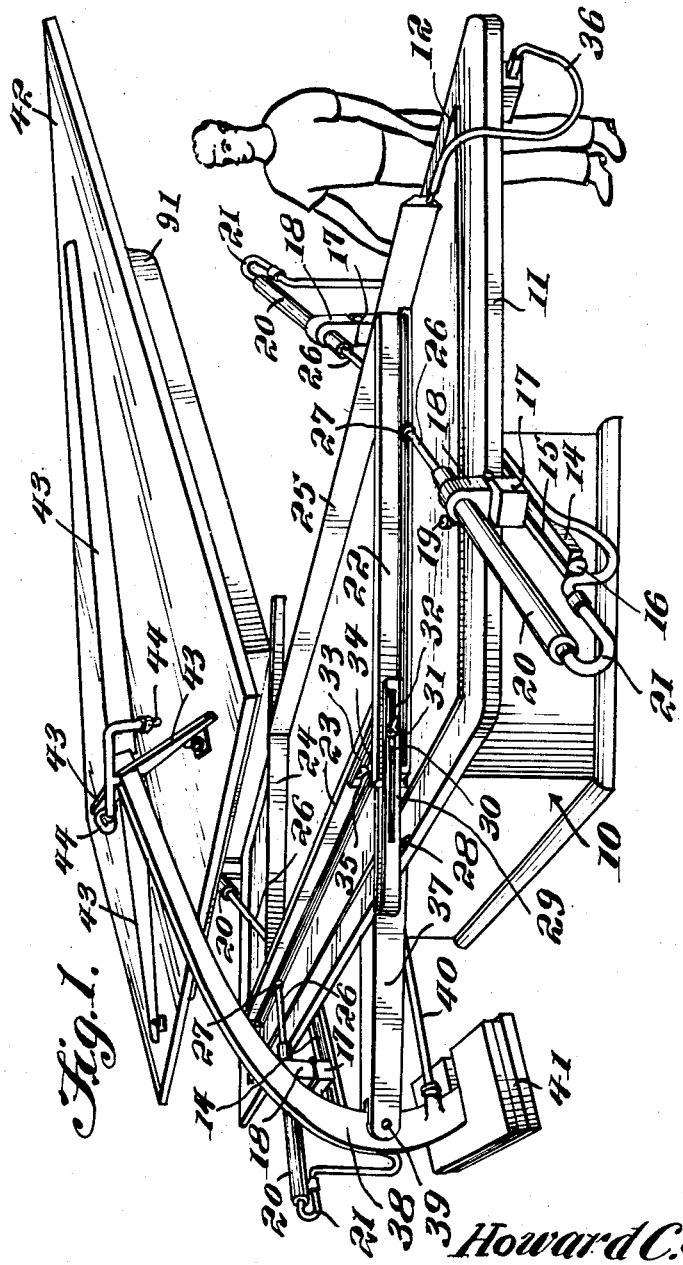

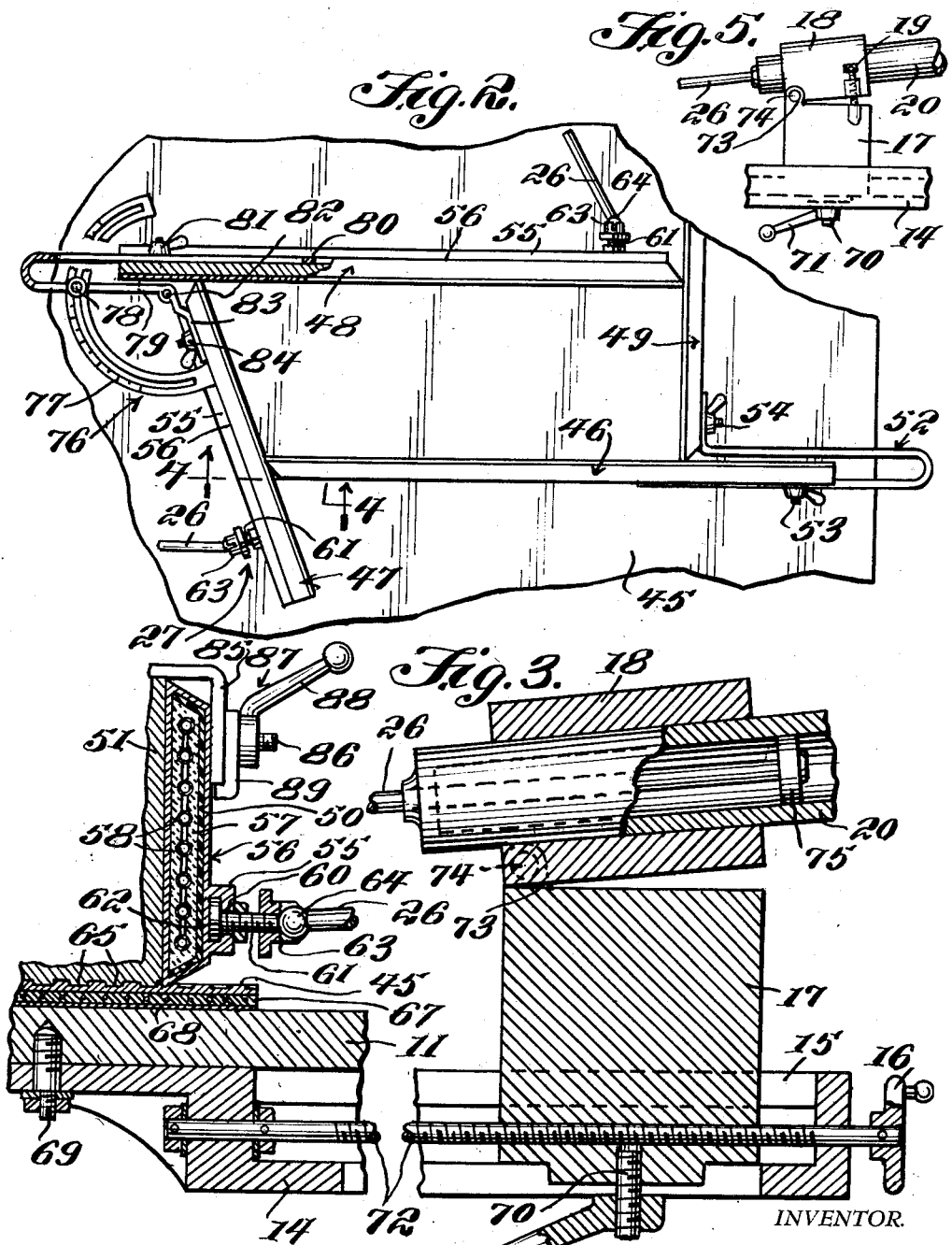

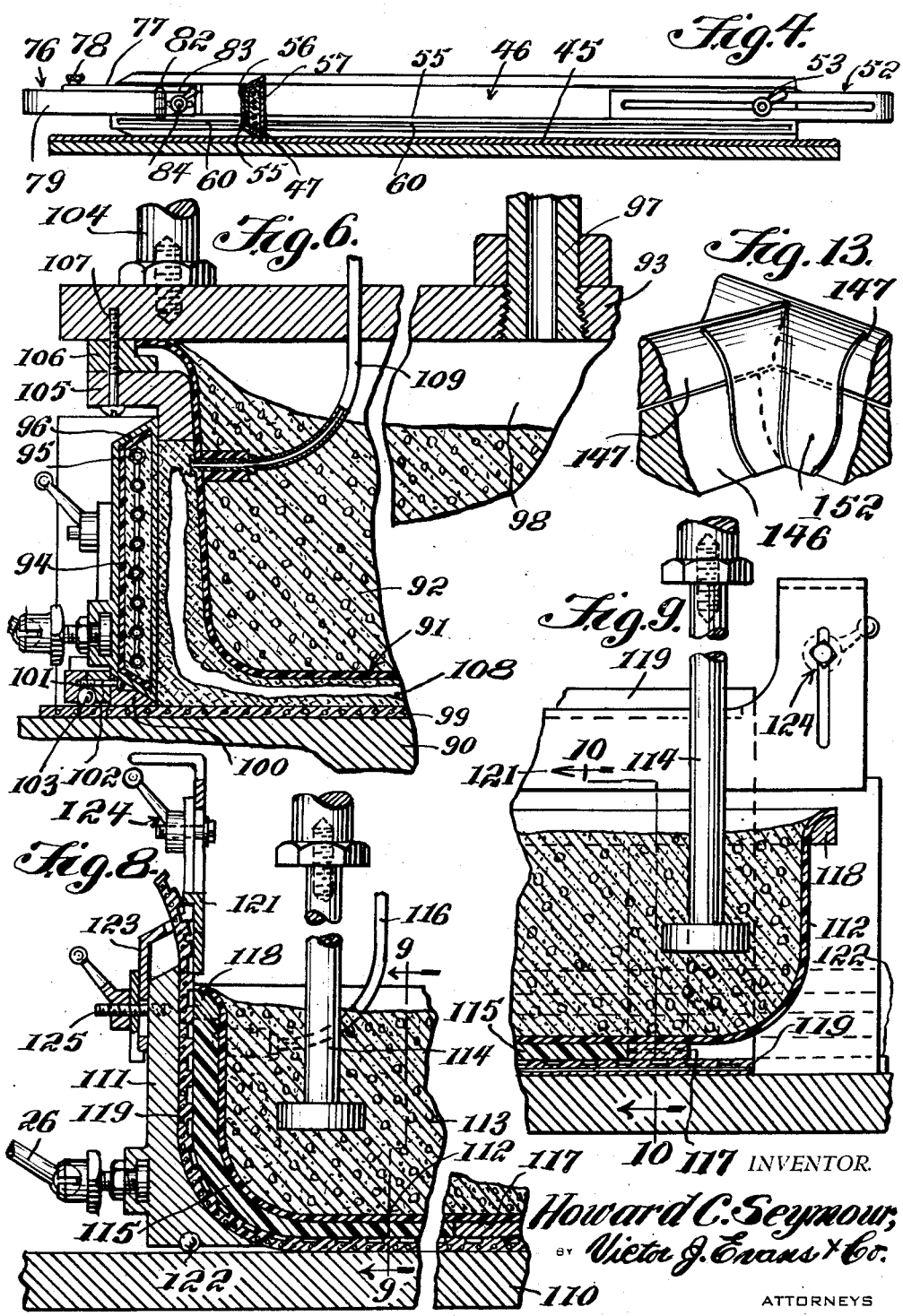

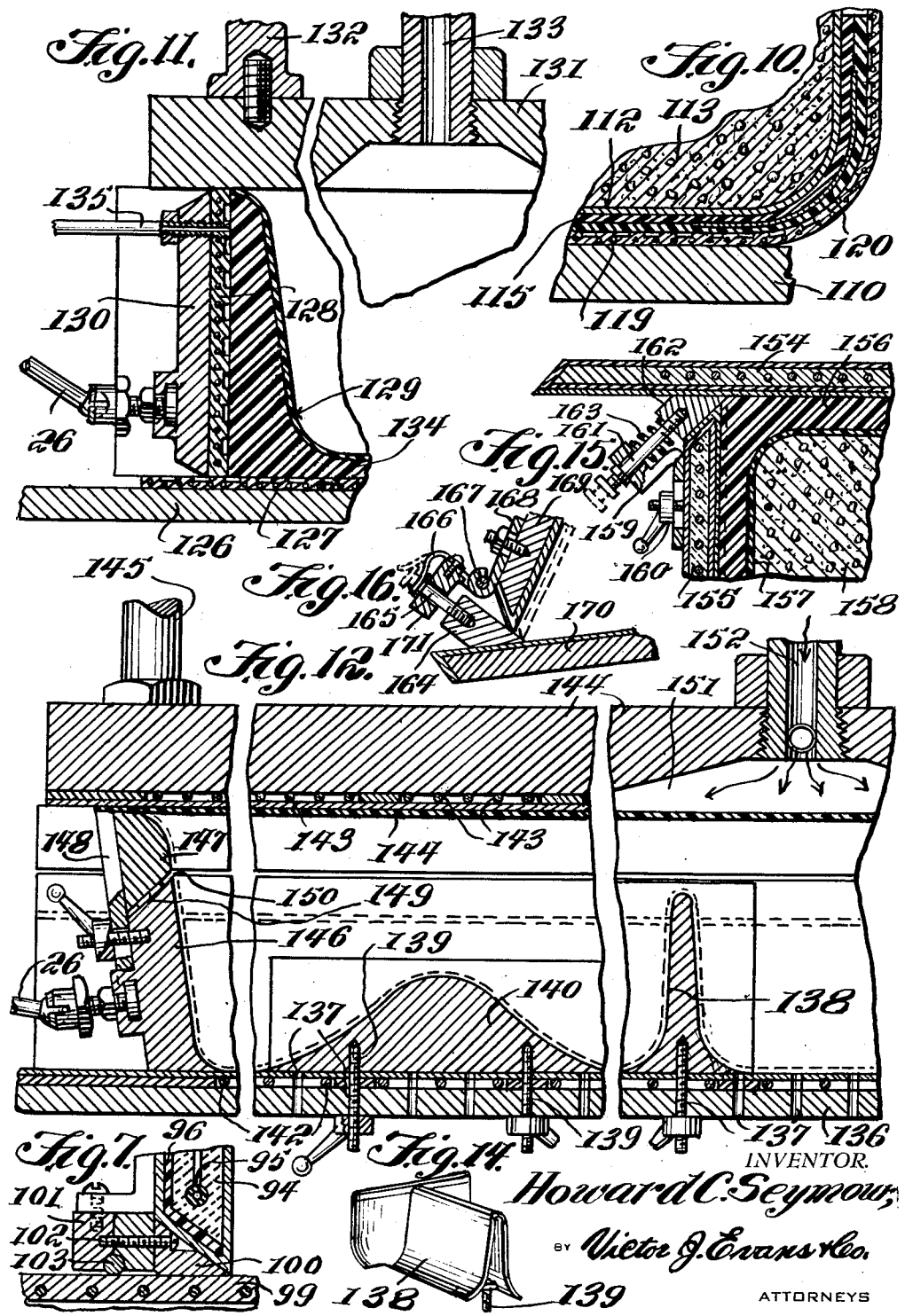

2,781,570

ADJUSTABLE MOLD

Howard C. Seymour, New York, N. Y.

Application February 26, 1954, Serial No. 412,852

2 Claims. (Cl. 25—41)

This invention relates to adjustable molds, and more particularly to adjustable molds for handling and shaping such materials as concrete, plastics and the like.

The object of the invention is to provide adjustable molds which can be readily adjusted to permit various materials such as plastics, concrete and the like to be molded or shaped into a large variety of configurations.

Another object of the invention is to provide an adjustable mold for precasting various parts such as building sections or units, there being adjustable hydraulic cylinders or jacks for controlling the finishing of the parts of the molds and wherein heating means is provided for controlling the setting, curing or shaping of the material.

A further object of the invention is to provide adjustable molds which are extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing an adjustable mold, constructed according to the present invention.

Figure 2 is a plan view of a typical four sided mold.

Figure 3 is a fragmentary sectional view taken through a portion of a modified mold showing the cylinder support and heating means.

Figure 4 is a sectional view taken on the line 4—4 of Figure 2.

Figure 5 is a fragmentary elevational view showing one of the cylinder supports.

Figure 6 is a fragmentary sectional view showing another modified mold.

Figure 7 is a fragmentary sectional view showing a portion of the apparatus of Figure 6.

Figure 8 is a fragmentary sectional view taken through still another modified mold.

Figure 9 is a sectional view taken on the line 9—9 of Figure 8.

Figure 10 is a sectional view taken on the line 10—10 of Figure 9.

Figure 11 is a fragmentary sectional view showing another modified mold.

Figure 12 is a sectional view showing a portion of still another modified mold.

Figure 13 is a fragmentary sectional view showing a corner of a mold.

Figure 14 is a perspective view of a removable rib.

Figure 15 is a fragmentary sectional view showing a still further modification.

Figure 16 is a fragmentary sectional view showing a further modification.

Referring in detail to Figure 1 of the drawings, the numeral 10 designates an upright which can be made of any suitable material, and supported on the upright 10 is a horizontally disposed base 11. A plate 12 is supported on the base 11, and the plate 12 may be a heating plate for supplying heat to the material being molded so as to control the curing or setting of the material.

Secured to the undersurface of the base 11 is a plurality of outwardly projecting channels 14 which are each provided with a slot 15. A support member 17 is adjustably mounted on each of the channels 14, and a handwheel 16 may be provided for rotating a suitable screw member in order to adjust the position of the support members 17. Pivotally connected to each of the support members 17 is a bearing block 18, and the bearing block 18 carries a leveling screw 19 whereby the angular position of the bearing block 18 can be varied as desired. Carried by each of the bearing blocks 18 is a cylinder or jack 20 which is adapted to be connected to a suitable source of hydraulic fluid, compressed air or the like, through the medium of a hose 21.

Movably supported on the plate 12 is a plurality of panels 22, 23, 24, and 25. A rod 26 extends from each of the cylinders 20, and a suitable connection such as a ball and socket joint 27 connects each of the rods 26 to a corresponding panel. U-shaped clamps 28 interconnect certain of the panels together, and the U-shaped clamps 28 include a leg 29 provided with a slot 30 through which extends a stud 31. A nut 32 is arranged in engagement with the stud 31, and each of the clamps 28 further includes a flange 33 which is provided with a slot 34 through which extends a bolt and nut assembly 35. A line 36 is further provided for the assembly.

Extending rearwardly from the apparatus is an arm 37 which is provided with a bifurcated rear portion, and a bar 38 is pivotally connected to the bifurcated portion of the arm 37 by means of a pin 39. A suitable hydraulic ram 40 may be provided for pivoting the bar 38, and a counterweight 41 is secured to the lower end of the bar 38. A cover 42 is connected to the upper end of the bar 38 through the medium of braces 43, and a pair of nozzles or hoses 44 extend through the cover 42.

In using the apparatus of Figure 1, the material to be molded which may be a suitable plastic or cementitious material is positioned between the panels 22, 23, 24, and 25. Then, these panels can be adjusted to the desired position by actuating the cylinders 20 and the cover 42 can be lowered and heat can be applied to the material through the medium of the plate 12. The material can thus be molded in the form of a slab so as to form any suitable unit as for example a precast building section or wall or the like.

Referring to Figures 2, 3 and 4 of the drawing, and also to Figure 5, there is shown a mold which includes a plate 45 that supports a plurality of movable panels 46, 47, 48, and 49. Suitable material 51 is adapted to be positioned between the mold so that it can be shaped and the material 51 may be concrete, plastic or the like, and the material 51 may be sprayed on if desired. The layer or material 51 may be either a sprayed plastic or metal. A substantially U-shaped clamp 52 may connect the panels 46 and 49 together, Figure 2. The clamp 52 is adjustably connected to the panel 46 by a bolt and nut assembly 53, and the clamp 52 is adjustably connected to the panel 49 by a bolt and nut assembly 54. The piston rods 26 are adjustably connected to guide members 55 which are formed on wall sections 56 that are arranged contiguous to the panels 47 and 48. Each of the wall sections 56 may be provided with refractory material 57 that has embedded therein heating coils 58, and insulating material 59 may be provided for directing the heat from the coils 58 inwardly to the material being molded. A threaded stud 61 extends through a slot 60 in the guide member 55, and a head 62 is arranged on the inner end of the stud 61, there being a bushing 63 arranged in engagement with the stud 61 and also arranged in engagement with a ball 64 which is connected to the inner ends of the piston rods 26.

The plate 45 may be provided with a plurality of recesses 65. A heating pad 67 having wires embedded therein is arranged below the plate 45, and a sheet of heat reflecting material 68 is interposed between the pad 67 and the base 11, and the base 11 may have the same construction as the previously described base 11. The channels 14 may be secured to the undersurface of the base 11 by suitable bolts or studs 69. A suitable stud 70 depends from each of the support members 17, and a crank 71 is arranged in engagement with each of the studs 70 so that by properly adjusting the crank 71 the support member 17 can be maintained immobile in its various adjusted positions. The numeral 72 designates the screw member which engages the support members 17, and the screw members 72 have connected to an end thereof the handwheel 16. A pair of spaced parallel ears 73 extend upwardly from each of the support members 17, and pins 74 pivotally connect the blocks 18 between the ears 73, so that by adjusting the leveling screws 19 the angular position of the cylinders 20 can be varied as desired. A suitable piston 75 is reciprocably arranged in each of the cylinders 20.

There is further provided a protractor like clamp 76 for interconnecting the panels 47 and 48 together. This protractor like clamp 76 includes a sector 77 that is provided with an elongated slot for receiving a screw 78 that extends from a first leg 79, and the leg 79 is formed integral with or secured to a second leg 80 through which extends a bolt and nut assembly 81, Figure 2. A hinge 82 connects a flange 83 to the leg 79, and the flange 83 is secured by a bolt and nut assembly 84 to the panel 50, Figure 2.

Referring to Figure 3 it will be seen that there has been provided a clamp 87 which includes an L-shaped bar 85, a stud 86, and a crank arm 88, there being a spacer member 89 arranged contiguous to the bar 85.

Referring to Figure 6 of the drawings there is shown a further modification wherein the numeral 90 designates a horizontally disposed base, and the numeral 91 designates a male mold member. The male mold member 91 is permanently attached to a cover 93, and a filler 92 is positioned within the mold member 91, the filler 92 being any suitable material such as a cementitious material. Sides 94 having heating elements 95 embedded therein, are provided, and the sides may have a heat reflecting member 96. A space 98 is provided for receiving the air discharged through the conduit 97, and a heating pad 99 is arranged just above the base 90. A resilient wedge like member 100 is secured in place by studs 102 which extend into bars 101, and suitable rollers or bearings 103 are provided for supporting the bars 101. The cover 93 can be supported by bearing arms 104, and the resilient band 105 is secured in place by bolts 107 which extend through a member 106 and into engagement with the cover 93. A Fiberglas mass 108 can be interposed between the mold member or pan 91 and the adjacent parts, and the resin 108 can be injected through a tube 109.

The male mold 91 is permanently attached to the cover 93 by a resilient compression band 105 which runs continuously under the metal ring 106 and the parts 105, 106 can be bolted to the cover 93 by bolts 107. The sides 94 can be adjusted horizontally and the sides 94 in closed position press against the compression band 105 when the inner mold has been lowered into position. At this time a plastic mixture 108 which may be Fiberglas can be drawn or injected through the rubber tube 109 between the male and female molds and also at this time heat may be applied through the medium of the pad 99 to the inner mixture as well as through the sides 94. Synchronized with the above, pressure may be applied to both the inside and the outside molds to reduce the total cubage of the molds' capacity without applying any further pressure through the tube 109. Initially air may be introduced through tube 97 after the male inner mold has been lowered to the proper position, that is with the bottom of pan 91 resting on the reinforcing Fiberglas 108. Then the molds are closed and the plastic or resin 108 is introduced and by putting air pressure in the space 98, the male mold is forced down past the compression ring 105. The final compression of the pan 91 can be automatically stopped by means of the stop member 106. After the plastic unit around the male mold 91 has been completely cured, a vacuum may be applied through the tube 97 to pull the male back up to the first or original position then by means of a push on the compression ring 79 the finished unit can be ejected.

Referring to Figure 15 of the drawings there is shown a corner construction of an adjustable mold wherein the side walls are indicated by the numeral 154 and 155. A suitable plastic filler 156 is arranged adjacent the inner surface of these walls, and a male mold 157 has a suitable cementitious filler 158 therein. A bracket 159 can be secured to the wall 155 in any suitable manner, as for example by means of the crank bolt 160, and a stud 161 extends adjustably through the bracket 159. The stud 161 is arranged in engagement with a wedge 162 so as to seal the corner of the mold, and a coil spring 163 is circumposed on the stud 161 and abuts the wedge 162 for maintaining the wedge immobile.

In Figure 16 there is shown another corner construction wherein a wedge 164 is urged against the wall 170 by means of a stud 165 which has a spring member 166 arranged in engagement therewith. The stud 165 extends through a plate 171 that is pivotally connected to a bar 168 by means of a hinge construction 167, and the member 168 is secured to a wall 169 of the mold. Thus, the wedge 165 is yieldably held in place by the action of the spring 166.

Referring in detail to Figures 8, 9, and 10 of the drawings, there is shown a still further modified mold assembly wherein the numeral 110 designates the base and 111 designates side pieces or wall sections. A preformed male member 112 is provided, and a cementitious filler 113 may be provided in the male member 112. Bearing bars 114 may be embedded in or cast in the filler 113, and a suitable resin 115 can be injected into the space between the male member 112 and a heating pad 119 by means of a conduit or hose 116. A resin dam 117 is provided, and a compression band 118 is arranged contiguous to the top of the filler 116. The side pieces 111 may extend only on two sides of the mold so that channel shapes can be quickly and readily molded and such channel shapes can have rounded corners if desired. The bearing bars 114 can be attached to a standard overhead press so that the parts can be raised or lowered as desired. As previously stated the side pieces 111 are only on two sides of the mold, and a spring member 120, Figure 10, can be used for sealing off the open sides of the mold. A heating pad 119 is provided. A continuous plate 121 is arranged contiguous to the upper end of the device, Figure 8, and roller bearings 122 are provided for supporting the side section 111. A clamp 123 can be secured in place by crank assemblies 124 and 125, and the clamp 123 serves to maintain the side pieces 111 and heating pad 119 in their proper assembled position.

Referring to Figure 11 of the drawings there is shown another modified mold which includes a horizontally disposed base 126, heating pads 127 and 128, a preformed male mold 129, and side walls 130. A cover 131 is arranged above the base, and the cover 131 can be supported by supports 132, there being a conduit 133 extending through the cover 131. A Fiberglas mat 134 is arranged between the mold 129 and the heating pads, and a conduit 135 extends through the wall 130 and communicates with the space between the mold 129 and the heating pads. The hydraulic jack rod 26 can be used for adjusting the position of the walls. In this form of the invention there is shown a section of a symmetrical press mold with matched dies of precise inner and outer dimensions. The heating pads can have any desired top texture. By regulating the thickness of the Fiberglas mat 134, the shaping of the parts can be accurately controlled. High pressure air can be injected into the mold through the conduit 133 to help shape the parts.

Referring to Figures 12, 13 and 14 of the drawings, there are shown further modifications wherein the numeral 136 designates a base having a plurality of spaced openings 137 therein. Supported above the base 136 are suitable ribs 138, Figures 12 and 14, and securing elements 139 may extend through the openings 137 and into engagement with the ribs 138 and with corrugated members 140 for maintaining the members immobile in their various adjusted positions. Thus, when a thin sheet like member 141 which is to be molded is pressed down upon the parts 138 and 140 the sheet 141 will be provided with indentations or recesses that correspond to the shape of the parts 138 and 140. Suitable heating elements 142 may be arranged in or above the base 136, and heating elements 143 are arranged in a cover 144 that is supported by bars or arms 145. Wall sections 146 extend upwardly from the base, and wall extensions 147 may be mounted above the wall sections 146 to provide additional length when needed. Guide bars 148 are provided for maintaining the extensions 147 in their proper alined positions, and washers 149 are interposed at spaced points between the parts 146 and 147 to define a slot 150 through which air or the like may be passed interiorly to the mold. The inner surface of the cover 144 is provided with a cutout 151 which is in communication with a nozzle or conduit 152. The sheet 141 may be made of plastic, or metal of a thin gauge and can be used to manufacture a male mold member. Thus, with the apparatus shown in Figure 12, the thin sheet 141 can be heated and then simultaneously shaped to any desired configuration as for example by applying air pressure or steam through the nozzle 152. By providing the members 138 and 140 in the bottom of the mold, the completed pan like member formed from the sheet 141 will be provided with reinforced ribs or corrugations therein. The hollowed out space 151 insures that the steam or air pressure will be properly distributed over the upper surface of the sheet 141.

Referring to Figure 13 there is shown a corner member 153 for use with the mold of Figure 12, and the corner member 153 can be made of a pre-molded plastic or other suitable material, and the corner member 153 can be secured in place in any suitable manner, as for example by means of a suitable adhesive.

The plan view shown in Figure 2 may be the general plan configuration of all mold sides in the application except the two sided mold variations of Figures 8 and 9. The hinged cover of Figure 1 is an alternative construction to the use of a standard press to clamp shut the top and bottom portions of the molds in Figures 6, 11 and 12. The molds are not strictly vacuum molds since pressure can be applied if desired. The hinged cover of Figure 1 has the advantage of eliminating the column supports of a standard overhead press which could interfere with the assembly of the adjustable sides. However, when pressures above 1000 lbs. per square inch are to be standard within the cover, a large overhead press might prove advantageous. In other words the design of the top depends upon the operating pressure. Figures 8 and 9 are the only vacuum molds but of course a vacuum may be used in any of the molds to withdraw air and pull in a resin into the mold. The nozzles 44 can be either air or vacuum lines. Also, steam heat can be used wherever desired, and steam heat is less expensive than electrical heating in many localities. Line 36 in Figure 1 is the electrical conduit to the heating surfaces of the side 25 and the other sides may be hooked up in series from this flexible conduit. In some cases the conduits may be slung from above to move freely as the mold sides are opened and closed.

In Figure 2 the ends of the adjustable sides are cut at an angle of about 45 degrees and are provided with resilient sharp corners that may be made of a tough reinforced plastic or the like. The corners shown in Figures 15 and 16 can be used with the apparatus of Figure 6.

Figure 2 is a plan view of a typical four sided mold without the inner male mold included therein. The male mold can be blown or shaped in the apparatus shown in Figure 12.

In some initial stages of molding a pan shaped panel inside of a typical male and female mold, the only way to provide or have a thin even coat of pigmented plastic finish on the outside of the panel to be molded is to first spray this thin color finish coat inside the female mold. Then, when dry reinforcing is added in the back and then the male inner mold is closed and so is the cover and the structural plastic binder is injected. Then the material is cured under various heat or pressure conditions and in Figure 3 the numeral 51 designates the sprayed plastic or metal material.

The apparatus shown in Figures 2 and 3 is only one section, that is the female of the whole construction of female, male and cover.

The clamp 86 and angle 85 are detachable stops to be used only with the spraying of plastic finishes on the insides of the female before the male mold is lowered into place. In most cases the angle stop 85 would have to be removed after the spraying operation.

The recesses 65 in the textured heating pad 45 are merely a continuation of the overall pattern of the texture that is permanently molded in its surface. The heating pad would be stiff enough and backed with a rough abrasive underside to resist wrinkling or to prevent shifting or moving about.

In Figure 6 the pan or male mold 91 is shaped on the apparatus of Figure 12 as are all the male molds and these are then filled with a plastic or concrete filler as previously described. A hole for the resin pipe 109 can be bored in the male mold and on the opposite side of the male mold a hole for a similar vacuum tube can be provided so that air can be withdrawn from the space that the incoming resin will occupy. The apparatus of Figures 15 and 16 may form part of the mold of Figure 6.

The molds of the present invention are especially suitable for such materials as glass reinforced resins which do not require as high a pressure when being shaped as other types of synthetic plastics or resins. With injection molding machinery it is difficult to first compress a plastic mixture in a high pressure chamber and then forcibly inject the compressed mass over a large area since stress in the material results from such operations. In Figure 6 the downward push of the male mold 91 is controlled by the stop ring 106.

The recesses in the upper surface of the heating pad 119, Figure 8, are a continuation of the all over pattern of the textured surface. This surface sheet could be either initially cut from a sheet covered with the all over pattern or can be provided whenever necessary. The spring 120 inside the resin dam or side division 117, Figure 10, is a means of retaining the desired contour of the part 117 to prevent part 117 from easily shifting about. If desired part 117 may be permanently secured as by glue, to the male part 112 and in such cases part 117 would be of a single instead of a double layer. The spring 120 could then be omitted.

The temperature at which the male sheet material is softened and blown as for example as shown in Figure 12 may be at approximately 500 degrees. The working temperature of cure cycles is never allowed to go above 300 to 400 degrees unless a special type of plastic is being handled. The slot 150 in Figure 12 is part of the system of air holes which allow the air inside to be freely forced out as the sheet 141 is blown down against the profiles. Thus, no air will be trapped inside the mold to form wrinkles in the blown sheet.

I claim:

1. In a molding apparatus, an upright, a horizontally disposed base supported on said upright, a plurality of channels secured to said base and each provided with a longitudinally extending slot, a support member adjustably supported by each of said channels, manually operable means for moving said support members, a pair of spaced parallel vertically disposed ears extending upwardly from said support member, a bearing block pivotally mounted between said pair of ears, a leveling screw engaging said bearing block, a cylinder mounted on said bearing block and adapted to be connected to a source of hydraulic fluid under pressure, a rod connected to said cylinder, a heating plate supported on said base, a plurality of panels movably supported on said plate and connected to said rods, clamps connecting said panels together, an arm extending rearwardly from said base and provided with a bifurcated rear portion, a bar pivotally mounted in the bifurcated portion of said arm, a counterweight connected to the lower end of said bar, a cover connected to the upper end of said bar, a hydraulic ram for pivoting said bar, and nozzles carried by said arm for supplying air under pressure through said cover to the material between said panels.

2. In a molding apparatus, an upright, a base supported on said upright, a plurality of channels secured to said base and each provided with a slot, a support member adjustably supported by each of said channels, manually operable means for moving said support members, a pair of ears extending upwardly from said support member, a bearing block pivotally mounted between said pair of ears, a leveling screw engaging said bearing block, a cylinder mounted on said bearing block and adapted to be connected to a source of hydraulic fluid under pressure, a rod connected to said cylinder, a heating plate supported on said base, a plurality of panels movably supported on said plate and connected to said rods, clamps connecting said panels together, an arm extending from said base and provided with a bifurcated rear portion, a bar pivotally mounted in the bifurcated portion of said arm, a counterweight connected to said bar, a cover connected to said bar, a hydraulic ram for pivoting said bar, and nozzles carried by said arm for supplying air under pressure through said cover to the material between said panels.

References Cited in the file of this patent

UNITED STATES PATENTS

| | | |
|---|---|---|
| 748,611 | Jaques | Jan. 5, 1904 |
| 873,760 | Latham | Dec. 17, 1907 |
| 1,421,748 | Willard | July 4, 1922 |
| 2,416,559 | Wilson | Feb. 25, 1947 |
| 2,427,044 | Burns | Sept. 9, 1947 |
| 2,655,708 | Eschenbrenner | Oct. 20, 1953 |

FOREIGN PATENTS

| | | |
|---|---|---|
| 649,035 | Great Britain | Jan. 17, 1951 |